United States Patent
Tsai et al.

(10) Patent No.: US 8,767,795 B2
(45) Date of Patent: Jul. 1, 2014

(54) HYBRID ORTHOGONAL FREQUENCY DIVISION MULTIPLE ACCESS WTRU AND METHOD

(71) Applicant: Intel Corporation, Santa Clara, CA (US)

(72) Inventors: Yingming Tsai, Boonton, NJ (US); Guodong Zhang, Syosset, NY (US); Jung-Lin Pan, Smithtown, NY (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/706,811

(22) Filed: Dec. 6, 2012

(65) Prior Publication Data

US 2013/0100995 A1   Apr. 25, 2013

Related U.S. Application Data

(63) Continuation of application No. 13/236,147, filed on Sep. 19, 2011, now Pat. No. 8,340,153, which is a continuation of application No. 12/776,769, filed on May 10, 2010, now Pat. No. 8,023,551, which is a continuation of application No. 11/406,878, filed on Apr. 19, 2006, now Pat. No. 7,715,460.

(60) Provisional application No. 60/673,872, filed on Apr. 22, 2005.

(51) Int. Cl.
*H04B 1/00* (2006.01)

(52) U.S. Cl.
USPC .......................................................... 375/131

(58) Field of Classification Search
None
See application file for complete search history.

(56) References Cited

U.S. PATENT DOCUMENTS

| | | | |
|---|---|---|---|
| 6,754,169 B2 | 6/2004 | Baum et al. | |
| 6,795,424 B1 | 9/2004 | Kapoor et al. | |
| 7,724,638 B2 * | 5/2010 | Murakami et al. | 370/208 |
| 2003/0081538 A1 | 5/2003 | Walton et al. | |
| 2003/0112744 A1 | 6/2003 | Baum et al. | |
| 2004/0174812 A1 | 9/2004 | Murakami et al. | |

FOREIGN PATENT DOCUMENTS

| | | |
|---|---|---|
| CN | 1547818 | 11/2004 |
| EP | 1416657 | 5/2004 |
| EP | 1496632 | 1/2005 |
| GB | 2394871 | 5/2004 |
| JP | 2002190788 | 7/2002 |
| JP | 2003152679 | 5/2003 |
| JP | 2003249911 | 9/2003 |
| WO | WO-2006003761 | 1/2006 |

OTHER PUBLICATIONS

"Office Action with Search for Taiwan Application No. 095114007", (Sep. 7, 2012), Whole Document.

(Continued)

*Primary Examiner* — Khanh C Tran
(74) *Attorney, Agent, or Firm* — Blakely, Sokoloff, Taylor & Zafman LLP

(57) ABSTRACT

A hybrid orthogonal frequency division multiple access (OFDMA) wireless transmit/receive unit (WTRU) and method are disclosed. A WTRU includes a transmitter and a receiver. The receiver processes received data to recover data mapped to the subcarriers using OFDMA. The receiver recovers first input data by separating user data from multi-user spread data and recovers second input data from non-spread data.

20 Claims, 3 Drawing Sheets

(56) References Cited

OTHER PUBLICATIONS

"Office Action for European Patent Application No. 12181941.1", (Dec. 12, 2012), Whole Document.
International Search Report for International Application No. PCT/US2006/014947 dated May 11, 2007, 2 pages.
Written Opinion for International Application No. PCT/US2006/014947 dated May 11, 2007, 3 pages.
International Preliminary Report on Patentability for International Application No. PCT/US2006/014947 dated Oct. 23, 2007, 4 pages.
Office Action for Japanese Application No. 2011-024062 dated Aug. 6, 2013, 5 pages.
Office Action for Chinese Application No. 201110118212.6 dated Jun. 3, 2013, 17 pages.

* cited by examiner

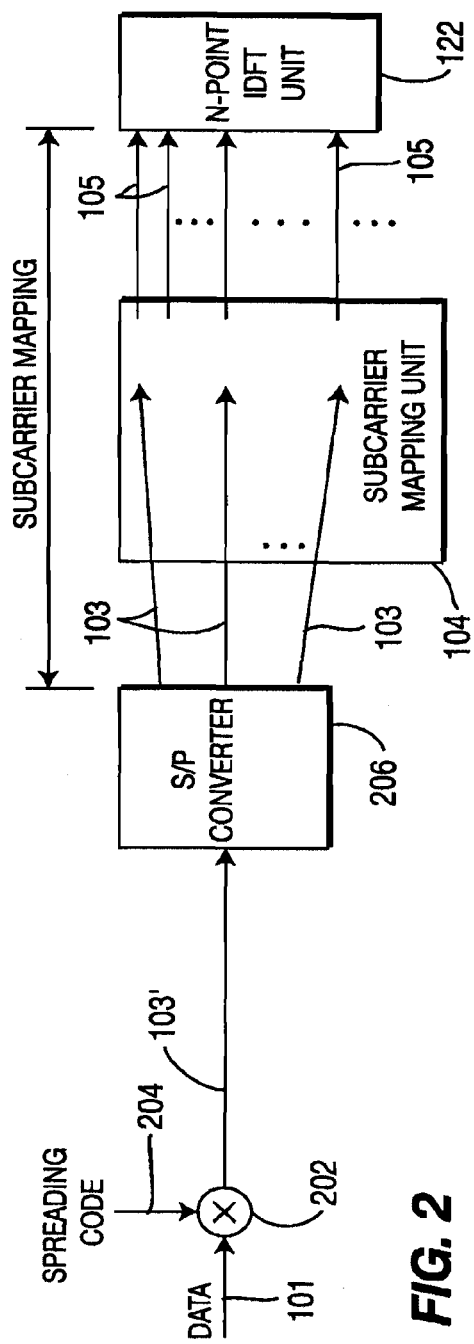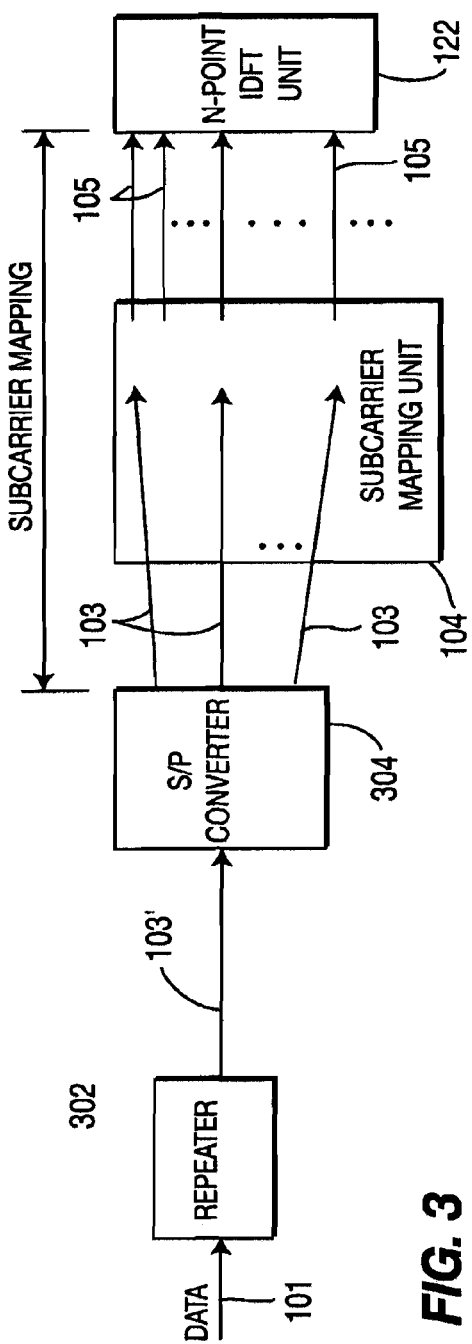

HYBRID ORTHOGONAL FREQUENCY DIVISION MULTIPLE ACCESS WTRU AND METHOD

CROSS REFERENCE TO RELATED APPLICATIONS

This application is a continuation of U.S. patent application Ser. No. 13/236,147, U.S. patent application No. filed Sep. 19, 2011, issuing as U.S. Pat. No. 8,340,153 on Dec. 25, 2012, which is a continuation of Ser. No. 12/776,769, filed May 10, 2010, issued as U.S. Pat. No. 8,023,551 on Sep. 20, 2011, which is a continuation of U.S. patent application Ser. No. 11/406,878 filed Apr. 19, 2006, which issued as U.S. Pat. No. 7,715,460 on May 11, 2010, which claims the benefit of U.S. Provisional Application No. 60/673,872 filed Apr. 22, 2005, which are incorporated by reference as if fully set forth.

FIELD OF INVENTION

This application is related to wireless communications.

BACKGROUND

It is expected that future wireless communication systems will provide broadband services such as wireless Internet access to subscribers. Such broadband services require reliable and high throughput transmissions over a wireless channel which is time dispersive and frequency selective. The wireless channel is subject to limited spectrum and inter-symbol interference (ISI) caused by multipath fading. Orthogonal frequency division multiplexing (OFDM) and OFDMA are some of the most promising solutions for next generation wireless communication systems.

OFDM has a high spectral efficiency since the subcarriers used in the OFDM system overlap in frequency and an adaptive modulation and coding scheme (MCS) may be employed across subcarriers. In addition, implementation of OFDM is very simple because the baseband modulation and demodulation are performed by simple inverse fast Fourier transform (IFFT) and fast Fourier transform (FFT) operations. Other advantages of the OFDM system include a simplified receiver structure and excellent robustness in a multipath environment.

OFDM and OFDMA have been adopted by several wireless/wired communication standards, such as digital audio broadcast (DAB), digital audio broadcast terrestrial (DAB-T), IEEE 802.11a/g, IEEE 802.16, asymmetric digital subscriber line (ADSL) and is being considered for adoption in third generation partnership project (3GPP) long term evolution (LTE), cdma2000 evolution, a fourth generation (4G) wireless communication system, IEEE 802.11n, or the like. One key problem with OFDM and OFDMA is that it is difficult to mitigate or control inter-cell interference to achieve a frequency reuse factor of one. Frequency hopping and subcarrier allocation cooperation between cells have been proposed to mitigate inter-cell interference. However, the effectiveness of both methods is limited.

SUMMARY

A hybrid orthogonal frequency division multiple access (OFDMA) wireless transmit/receive unit (WTRU) and method are disclosed herein. A WTRU includes a transmitter and a receiver. The receiver processes received data to recover data mapped to the subcarriers using OFDMA, and recovers first input data by separating user data from multi-user spread data and second input data from non-spread data.

BRIEF DESCRIPTION OF THE DRAWINGS

FIG. 2 shows an example of frequency domain spreading and subcarrier mapping.

FIG. 3 shows another example of spreading and subcarrier mapping.

DETAILED DESCRIPTION

Hereafter, the terminology "transmitter" and "receiver" includes but are not limited to a user equipment (UE), a wireless transmit/receive unit (WTRU), a mobile station, a fixed or mobile subscriber unit, a pager, a Node-B, a base station, a site controller, an access point or any other type of device capable of operating in a wireless environment.

The features disclosed herein may be incorporated into an integrated circuit (IC) or be configured in a circuit comprising a multitude of interconnecting components.

The teachings herein are applicable to any wireless communication system that utilizes OFDMA (or OFDM) and/or code division multiple access (CDMA), such as IEEE 802.11, IEEE 802.16, third generation (3G) cellular systems, 4G systems, satellite communication systems, or the like.

Figure 1:
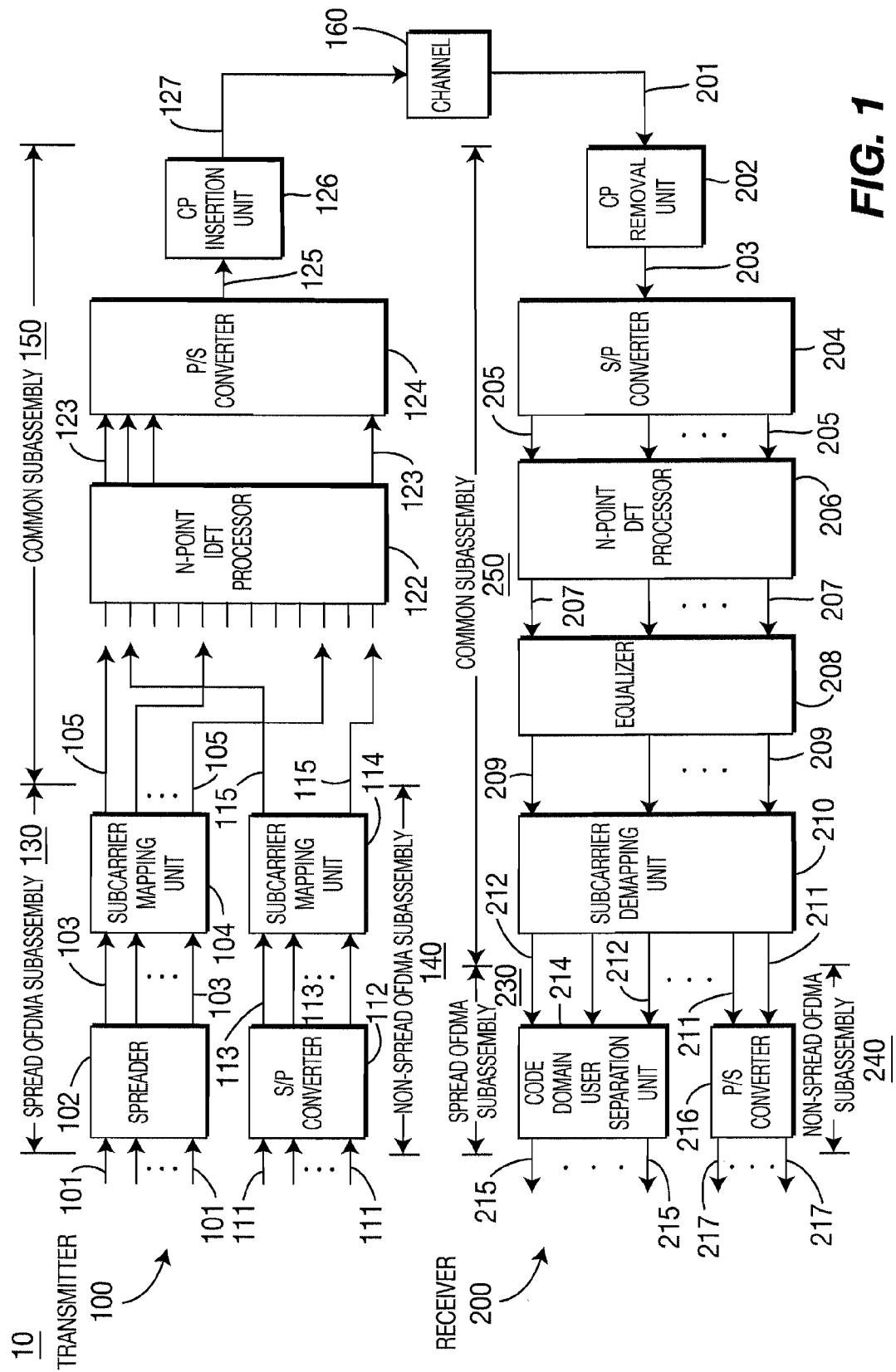
FIG. 1 is a block diagram of an exemplary hybrid OFDMA system.

FIG. 1 is a block diagram of an exemplary hybrid OFDMA system 10 including a transmitter 100 and a receiver 200 in accordance with the teachings herein. The transmitter 100 includes a spread OFDMA subassembly 130, a non-spread OFDMA subassembly 140 and a common subassembly 150. In the spread OFDMA subassembly 130, input data 101 (for one or more users) is spread with a spreading code to generate a plurality of chips 103 and the chips 103 are then mapped to subcarriers. In the non-spread OFDMA subassembly 140, input bit 111 (for one or more different users) is mapped to subcarriers without spreading.

The spread OFDMA subassembly 130 includes a spreader 102 and a first subcarrier mapping unit 104. The non-spread OFDMA subassembly 140 includes a serial-to-parallel (S/P) converter 112 and a second subcarrier mapping unit 114. The common subassembly 150 includes an N-point inverse discrete Fourier transform (IDFT) processor 122, a parallel-to-serial (P/S) converter 124 and a cyclic prefix (CP) insertion unit 126.

Assuming that there are N subcarriers in the system and that K different users communicate at the same time in the system, among K users, data to $K_s$ users is transmitted via the spread OFDMA subassembly 130. The number of subcarriers used in the spread OFDMA subassembly 130 and the non-spread OFDMA subassembly 140 are $N_s$ and $N_o$, respectively. The values of $N_s$ and $N_o$ satisfy the conditions that $0 \leq N_s \leq N$, $0 \leq N_o \leq N$, and $N_s + N_o \leq N$.

The input data 101 is spread by the spreader 102 to a plurality of chips 103. The chips 103 are mapped to the $N_s$ subcarriers by the subcarrier mapping unit 104. The spreading may be performed in the time domain, in the frequency domain, or both. For a particular user, spreading factors in the time domain and the frequency domain are denoted by $SF_t$ and $SF_f$, respectively. A joint spreading factor for the user is denoted by $SF_{joint}$, which equals to $SF_t \times SF_f$. When $SF_t = 1$, the spreading is performed only in the frequency domain, and when $SF_f=1$, the spreading is performed only in the time domain. A frequency domain spreading for user i is limited to the number of subcarriers allocated to the user i, $N_s(i)$. The allocation of subcarriers can be static or dynamic. In the case where $N_s(i)=N_s$ for every user i, the spread OFDMA becomes spread OFDM.

One subcarrier may be mapped to more than one user in the spread OFDMA subassembly 130. In such case input data 101 of two or more users mapped to the same subcarrier are code multiplexed, and therefore, should be spread using different spreading codes. If spreading is performed both in the time and frequency domain, spreading codes assigned to users may be different in the time domain, in the frequency domain, or both.

FIG. 2 shows an example of frequency domain spreading and subcarrier mapping in accordance with the teachings herein. The input data 101 is multiplied with a spreading code 204 by a multiplier 202 to generate a plurality of chips 103'. The chips 103' are converted to parallel chips 103 by an S/P converter 206. Each of the parallel chips 103 is then mapped to one of the subcarriers by the subcarrier mapping unit 104 before being sent to the IDFT processor 122.

FIG. 3 shows another example of frequency domain spreading and subcarrier mapping in accordance with the teachings herein. Instead of multiplying a spreading code by a spreader, a repeater 302 may be used to repeat each input data 101 multiple times at the chip rate to generate chips 103'. The chips 103' are then converted to parallel chips 103 by an S/P converter 304. Each of the parallel chips 103 is mapped to one of the subcarriers by the subcarrier mapping unit 104 before being sent to the IDFT processor 122.

Alternatively, when input data is spread in the time domain, each input data is spread by a spreader to generate a plurality of chip streams and the chip streams are mapped to subcarriers. In such case, the time domain spreading may also be performed by simple repetition of the input data without using a spreading code.

Common pilots may be transmitted on the subcarriers used in the spread OFDMA subassembly 130. In order to distinguish from other user data, common pilots are also spread.

Referring again to FIG. 1, in the non-spread OFDMA subassembly 140, input bits 111 of different users are converted to parallel bits 113 by the S/P converter 112. The subcarrier mapping unit 114 allocates users to one or more subcarriers, such that each subcarrier is used by at most one user and bits from each user are mapped to the allocated subcarriers for the user by the subcarrier mapping unit. In this way, users are multiplexed in the frequency domain. The number of subcarriers allocated to user i is denoted by $N_o(i)$, $0 \le N_o(i) \le N_o$. The allocation of subcarriers can be static or dynamic.

In accordance with the teachings herein, time-frequency hopping may be performed for the non-spread OFDMA subassembly 140 in a pseudo-random way in each cell. With time domain hopping, the users that transmit in a cell change from time to time (i.e., over one or several OFDM symbols or frames). With frequency domain hopping, subcarriers allocated to users that transmit in a cell are hopping per one or several OFDM symbols or frames. In this way, the inter-cell interference can be mitigated and averaged among the users and cells.

Figure 4:
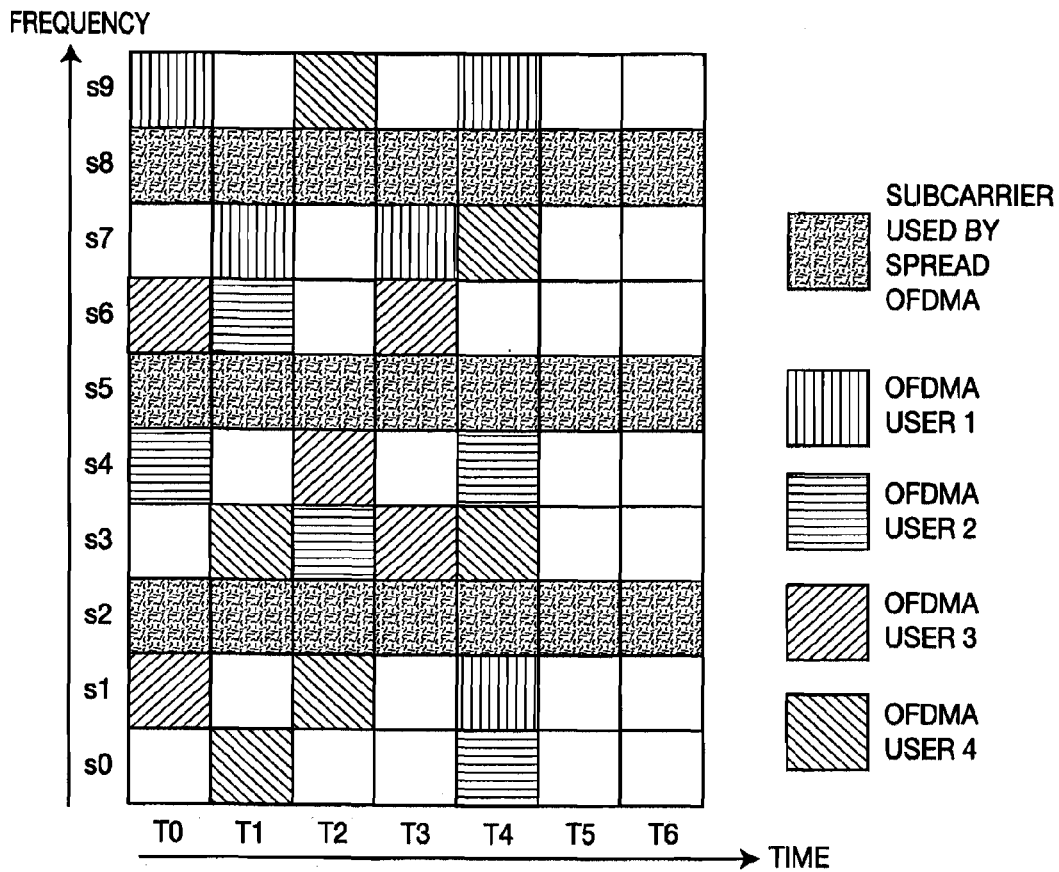
FIG. 4 shows an example of time-frequency hopping of subcarriers.

FIG. 4 illustrates an example of time-frequency hopping where ten (10) subcarriers, s0-s9, are used for time periods of T0-T6 in accordance with the teachings herein. As an example, in FIG. 2, subcarriers s3, s5, s8 are used for spread OFDMA and the remaining subcarriers are used for non-spread OFDMA. For the subcarriers allocated for non-spread OFDMA, subcarriers and time periods allocated to users are hopping in a pseudo-random way. For example, data for user 1 is transmitted via s9 at T0, s7 at T1, s7 at T3, and s1 and s9 at T4, and data for user 2 is transmitted via s4 at T0, s6 at T1, s3 at T2, s0 and s4 at T4. Therefore, data to different users is transmitted over different OFDM symbols or frames and inter-cell interference is mitigated.

Referring again to FIG. 1, both the chips 105 and the data 115 are fed into the IDFT processor 122. The IDFT processor 122 converts the chips 105 and data 115 to time domain data 123. The IDFT may be implemented by IFFT or an equivalent operation. The time domain data 123 is then converted to a serial data 125 by the P/S converter 124. A CP (also known as a guard period (GP)) is then added to the serial data 125 by the CP insertion unit 126. Data 127 is then transmitted via the wireless channel 160.

The receiver 200 includes a spread OFDMA subassembly 230, a non-spread OFDMA subassembly 240 and a common subassembly 250 for hybrid OFDMA. The common subassembly 250 includes a CP removal unit 202, a P/S converter 204, an N-point discrete Fourier transform (DFT) processor 206, an equalizer 208 and a subcarrier demapping unit 210. The spread OFDMA subassembly 230 includes a code domain user separation unit 214 and the non-spread OFDMA subassembly 240 includes a P/S converter 216.

The receiver 200 receives data 201 transmitted via the channel. A CP is removed from received data 201 by the CP removal unit 202. Data 203 after the CP is removed, which is time domain data, is converted to parallel data 205 by the S/P converter 204. The parallel data 205 is fed to the DFT processor 206 and converted to frequency domain data 207, which means N parallel data on N subcarriers. The DFT may be implemented by FFT or equivalent operation. The frequency domain data 207 is fed to the equalizer 208 and equalization is performed to data at each subcarrier. As in a conventional OFDM system, a simple one-tap equalizer may be used.

After equalization at each subcarrier, data corresponding to a particular user is separated by the subcarrier demapping unit 210, which is an opposite operation performed by the subcarrier mapping units 104, 114 at the transmitter 100. In the non-spread OFDMA subassembly 240, each user data 211 is simply converted to a serial data 217 by the S/P converter 216. In the spread OFDMA subassembly 230, data 212 on the separated subcarriers are further processed by the code domain user separation unit 214. Depending on the way spreading is performed at the transmitter 100 corresponding user separation is performed in the code domain user separation unit 214. For example, if the spreading is performed only in the time domain at the transmitter 100, a conventional Rake combiner may be used as the code domain user separation unit 214. If the spreading is performed only in the frequency domain at the transmitter 100, a conventional (frequency domain) despreader may be used as the code domain user separation unit 214. If the spreading is performed in both the time domain and the frequency domain at the transmitter 100, a time-frequency Rake combiner may be used as the code domain user separation unit 214.

Figure 5:
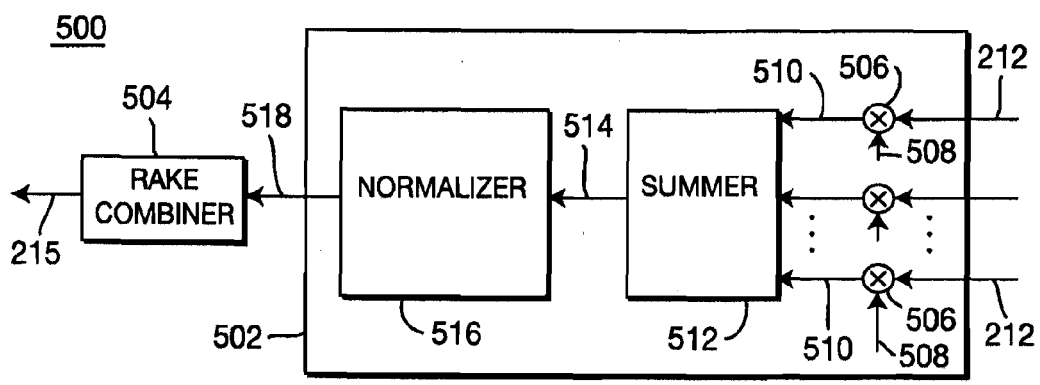
FIG. 5 is a block diagram of an exemplary time-frequency Rake combiner configured.

FIG. 5 is a block diagram of an exemplary time-frequency Rake combiner 500 configured in accordance with the teachings herein. The time-frequency Rake combiner 500 performs processing at both time and frequency domains in order to recover data that is spread in both time and frequency domains at the transmitter 100. It should be noted that the time-frequency Rake combiners 500 may be implemented in many different ways and the configuration shown in FIG. 5 is provided as an example, not as a limitation, and the scope of the teachings herein is not limited to the structure shown in FIG. 5.

The time-frequency Rake combiner 500 comprises a despreader 502 and a Rake combiner 504. Data 212 separated and collected for a particular user by the subcarrier demapping unit 210 in FIG. 1 for the spread OFDMA subassembly 230 is forwarded to the despreader 502. The despreader 502 performs frequency-domain despreading to the data 212 on the subcarriers. The despreader 502 includes a plurality of multipliers 506 for multiplying conjugate 508 of the spreading codes to the data 212, a summer 512 for summing the multiplication outputs 510, and a normalizer 516 for normalizing the summed output 514. The despreader output 518 is then processed by the Rake combiner 504 to recover the data of the user by time domain combining.

Referring again to FIG. 1, the transmitter 100, the receiver 200, or both may include multiple antennas and may implement hybrid OFDMA in accordance with the teachings herein with multiple antennas either at transmitter side, the receiver side, or both.

Although the features and elements herein are described in the preferred embodiments in particular combinations, each feature or element can be used alone without the other features and elements of the preferred embodiments or in various combinations with or without other features and elements described herein.

What is claimed is:

1. An apparatus, comprising circuitry to:
   receive information mapped to a first group, a second group, and a third group of subcarriers for transmission in a first symbol time interval;
   wherein a first portion of the information is spread, using orthogonal sequences, on the first group of subcarriers for a plurality of user equipments (UE)s;
   wherein a second portion of the information is mapped on the second group of subcarriers for one UE; and
   wherein a third portion of the information is pilot information mapped to the third group of subcarriers.

2. The apparatus of claim 1, wherein each of the orthogonal sequences used for each UE of the plurality of UEs is different.

3. The apparatus of claim 1, wherein the second portion of the information is not spread using orthogonal sequences.

4. The apparatus of claim 1, wherein the pilot information is spread over the third group of subcarriers.

5. The apparatus of claim 1, further comprising mapping the second portion of information on a second symbol time interval.

6. The apparatus of claim 5, wherein the second portion of information is mapped to consecutive subcarriers in the second symbol time interval.

7. The apparatus of claim 1, wherein the first portion of the information is spread on the first group of subcarriers in the frequency domain.

8. A wireless transmit/receive unit (WTRU), comprising:
   a spreader for spreading received multi-user input data using orthogonal sequences in a first symbol time interval of a orthogonal frequency multiple access (OFDMA) frame, wherein the multi-user input data is for a plurality of user equipments (UEs) and is spread using a plurality of orthogonal sequences, wherein each orthogonal sequence of the plurality of orthogonal sequences is associated with a respective UE of the plurality of UEs, and wherein the multi-user input data is spread over a first group of transmission subcarriers;
   at least one mapping unit for mapping input data to a UE to map the input data to consecutive subcarriers in a second group of transmission subcarriers in the first symbol time interval, and for mapping pilot information to a third group of transmission subcarriers in the first symbol time interval.

9. The WTRU of claim 8 wherein the spreader is to spread multi-user input data in a frequency domain.

10. The WTRU of claim 8, further comprising:
    one or more antennas communicatively coupled to the WTRU.

11. The WTRU of claim 8, wherein the at least one mapping unit is further for dynamically allocating the second group of transmission subcarriers.

12. A method, comprising:
    mapping information to a first group, a second group, and a third group of subcarriers in a first symbol time interval;
    wherein the first group of subcarriers is allocated to a plurality of user equipments (UEs) and wherein orthogonal sequences are used to send a first portion of the information to the plurality of UEs spread over the first group of subcarriers in the frequency domain and not in the time domain, and the orthogonal sequence used for each UE of the plurality of UEs is different;
    wherein the second group of subcarriers is allocated to another UE and wherein a second portion of information is mapped to the second group of subcarriers without spreading.

13. The method of claim 12, wherein the second portion of information is mapped in the time domain and the frequency domain.

14. The method of claim 12 wherein subcarriers in the second group of subcarriers are dynamically allocated.

15. The method of claim 12, wherein pilot information is mapped to the third group of subcarriers in the first symbol time interval.

16. The method of claim 15, wherein the pilot information is spread among subcarriers of the third group of subcarriers.

17. The method of claim 12 wherein the second portion of information is also mapped in a second symbol time interval.

18. The method of claim 12, wherein the first time symbol interval is an orthogonal frequency division multiplexed (OFDM) symbol interval.

19. The method of claim 12, wherein the second portion of information is mapped to consecutive subcarriers in the second group of subcarriers.

20. The method of claim 12, wherein the plurality of UEs are adapted to operate according to a third generation partnership project (3GPP) communication standard.

* * * * *